United States Patent [19]
Naheiri et al.

[11] Patent Number: 6,102,985
[45] Date of Patent: Aug. 15, 2000

[54] PRESSURE SWING ADSORPTION PROCESS AND SYSTEM WITH DUAL PRODUCT STORAGE TANKS

[75] Inventors: Tarik Naheiri, Bath; Jochen Rainer Fischer, Whitehall; William Thomas Kleinberg, Emmaus, all of Pa.

[73] Assignee: Air Products and Chemicals, Inc., Allentown, Pa.

[21] Appl. No.: 09/200,340

[22] Filed: Nov. 25, 1998

[51] Int. Cl.[7] .............................................. B01D 53/053
[52] U.S. Cl. ............................... 95/101; 95/105; 95/130; 96/109; 96/130; 96/144
[58] Field of Search ................... 95/96–98, 100–105, 95/117–119, 122, 130, 139; 96/108, 109, 130, 144

[56] References Cited

U.S. PATENT DOCUMENTS

| 3,788,036 | 1/1974 | Lee et al. ........................... 96/130 X |
| 4,065,272 | 12/1977 | Armond ..................................... 55/25 |
| 4,194,892 | 3/1980 | Jones et al. ............................... 55/58 |
| 4,350,500 | 9/1982 | Esselink ............................. 95/130 X |
| 4,477,264 | 10/1984 | Kratz et al. ............................... 55/25 |
| 4,511,377 | 4/1985 | McCombs ................................ 55/163 |
| 4,519,813 | 5/1985 | Hagiwara et al. .................. 95/130 X |
| 4,561,865 | 12/1985 | McCombs ................................. 55/25 |
| 4,892,566 | 1/1990 | Bansal et al. ............................. 55/26 |
| 5,032,150 | 7/1991 | Knaebel ..................................... 55/20 |
| 5,071,449 | 12/1991 | Sircar ......................................... 55/26 |
| 5,228,888 | 7/1993 | Gmelin et al. ............................ 55/25 |
| 5,370,728 | 12/1994 | LaSala et al. .......................... 95/101 |
| 5,415,683 | 5/1995 | Leavitt ..................................... 95/101 |
| 5,518,526 | 5/1996 | Baksh et al. ........................ 95/130 X |
| 5,551,257 | 9/1996 | Jain ..................................... 95/130 X |
| 5,565,018 | 10/1996 | Baksh et al. ........................ 95/130 X |
| 5,658,371 | 8/1997 | Smolarek et al. ...................... 95/101 |
| 5,679,134 | 10/1997 | Brugerolle et al. ........................ 95/96 |
| 5,772,737 | 6/1998 | Andreani et al. .......................... 95/98 |
| 5,876,485 | 3/1999 | Andreani .............................. 95/130 X |
| 5,882,380 | 3/1999 | Sircar ......................................... 95/98 |
| 5,906,674 | 5/1999 | Tan et al. ............................. 95/130 X |
| 5,928,407 | 7/1999 | Amlinger .............................. 95/130 X |
| 5,935,297 | 8/1999 | Amlinger .............................. 95/130 X |

FOREIGN PATENT DOCUMENTS

| 0771583 | 5/1997 | European Pat. Off. . |
| 9-077502 | 3/1997 | Japan . |
| 10-194708 | 7/1998 | Japan . |

OTHER PUBLICATIONS

Zhang, Zhixiong et al., "Separation of a Nitrogen–Carbon Dioxide Mixture by Rapid Pressure Swing Adsorption", Adsorption 4, 173–177, 1998, Kluwer Academic Publishers.

Primary Examiner—Robert Spitzer
Attorney, Agent, or Firm—John M. Fernbacher

[57] ABSTRACT

Pressure swing adsorption process and system for separating gas mixtures comprising at least one more strongly adsorbable component and at least one less strongly adsorbable component. The process includes storing gas enriched in one of the components in a first storage tank and a second storage tank. Final product gas is provided from the second storage tank while gas for purge, rinse, and/or repressurization is provided from the first storage tank.

16 Claims, 6 Drawing Sheets

PRESSURE SWING ADSORPTION PROCESS AND SYSTEM WITH DUAL PRODUCT STORAGE TANKS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Pressure swing adsorption is a well-known method for the separation of bulk gas mixtures and for the purification of gas streams containing low concentrations of undesirable components. The method has been developed and adapted for a wide range of operating conditions, product purity, and product recovery. Many pressure swing adsorption systems utilize two or more adsorber beds operated in a cyclic sequence in order to maintain a constant product flow rate while selected beds undergo various steps including adsorption, depressurization, desorption, purge, pressure equalization, repressurization, and other related steps. Multiple adsorber beds using numerous process steps are required to achieve high purity and/or recovery of valuable gaseous products such as hydrogen, carbon oxides, synthesis gas, light hydrocarbons, and the like. The high cost of generating the feed gas mixtures containing these valuable components usually justifies the complexity and capital expense of multiple-bed pressure swing adsorption systems.

A number of single-bed pressure swing adsorption (PSA) processes have been developed and are known in the art. Many of these processes operate partially at pressures below atmospheric and are described as vacuum swing adsorption (VSA) or vacuum-pressure swing adsorption (VPSA) processes. In the present specification, pressure swing adsorption (PSA) is used as a generic term to describe all types of cyclic adsorption systems regardless of operating pressure levels.

Other gaseous products amenable to recovery by PSA do not require the high purity and/or recovery of the above-named products. In the recovery of oxygen and nitrogen from air by PSA, for example, a lower purity product containing 90 to 95 vol % oxygen is acceptable for many end uses, and simpler PSA systems can be used to provide such a product. These simpler PSA systems have significantly lower capital and operating costs than the multiple-bed systems earlier described. The simplest of these PSA systems for air separation utilize a single adsorber bed in conjunction with one or more gas storage vessels to allow constant product flow and provide gas for adsorber purge and pressurization during the regeneration portion of the PSA cycle.

U.S. Pat. No. 4,561,865 discloses a single-bed PSA system comprising an adsorber and a surge tank operated with a feed compressor in a three-step cycle. First, compressed feed air is introduced into the adsorber, which increases the pressure in the adsorber, and simultaneously adsorber effluent is withdrawn into the surge tank. A portion of the gas is withdrawn from the surge tank as an oxygen-enriched product. The adsorber feed is then discontinued and the adsorber is vented countercurrently (i.e. through the adsorber feed end) to the atmosphere. During this venting step, purge gas from the surge tank is introduced into the product end of the adsorber. Upon completion of the vent/purge step, the adsorber and the surge tank are pressure equalized through the adsorber product end (i.e. countercurrently). The steps are repeated in a cyclic manner. U.S. Pat. No. 4,511,377 describes a modular apparatus using this PSA process.

A single-bed PSA system is described in U.S. Pat. No. 4,892,566 which utilizes an adsorber in conjunction with a surge tank, feed compressor, and switch valves to carry out a series of steps. First, compressed feed air is introduced into the adsorber, which increases the pressure in the adsorber while at the same time adsorber effluent is withdrawn into the surge tank. A portion of the gas is withdrawn from the surge tank as an oxygen-enriched product. The adsorber feed is discontinued and the adsorber outlet closed, and the adsorber is vented countercurrently (i.e. through the adsorber feed end) to the atmosphere. Gas from the surge tank is introduced into the adsorber countercurrently (i.e. through the adsorber product end) and the pressures in the adsorber and surge tank are equalized. The adsorber is then pressurized with feed air through the feed end and pressure equalized with the surge tank. The adsorber is further pressurized to a pressure above that of the surge tank, and finally the adsorber and surge tank are pressure equalized. The steps are then repeated in cyclic fashion.

U.S. Pat. No. 5,032,150 discloses a single-bed PSA process which utilizes multiple gas storage tanks in a PSA cycle to separate air. Compressed air is fed from an air feed tank into an adsorber presaturated with oxygen-rich gas from a previous cycle and the adsorber effluent is directed into a product collector tank, from which a portion of the gas is withdrawn as an oxygen-rich product. The adsorber outlet is then closed and the adsorber is pressure equalized with the air feed tank. Next, the adsorber is rinsed with nitrogen-rich gas from a nitrogen product tank, and the displaced gas is stored in the air feed tank. The nitrogen-saturated adsorber then is depressurized countercurrently (i.e. through the adsorber feed end) into the nitrogen product tank. Nitrogen may be withdrawn as a product if required. Finally the adsorber is purged countercurrently with oxygen-rich gas from the product collector tank to displace the nitrogen therein and then is pressurized countercurrently with the oxygen-rich gas to the adsorption pressure. The steps are repeated in a cyclic manner.

A single-vessel rapid PSA system is described in U.S. Pat. No. 5,071,449 in which the vessel contains dual adsorption layers and operates in alternating fashion with a continuous feed gas and two continuous product streams. A product surge tank is not used. Another rapid PSA system utilizing a single adsorbent bed operating in a cycle of 30 seconds or less is described in U.S. Pat. No. 4,194,892. The adsorber effluent optionally flows through a product surge tank to dampen flow fluctuations during adsorber cycling.

A single-bed PSA system with a product surge tank and an equalization tank is disclosed in U.S. Pat. No. 5,370,728. In the operation of this system, compressed air feed is introduced into the adsorbent bed, pressurizing the bed from an intermediate pressure up to a maximum adsorption pressure, and the effluent product is withdrawn from the bed into the product surge tank. The adsorbent bed then is isolated and depressurized cocurrently (i.e. through the product end) into an equalization tank at the intermediate pressure. Next, the bed is further depressurized countercurrently (i.e. through the feed end) to a lower desorption pressure, and the bed is purged countercurrently with gas from the product surge tank. The bed is then pressurized countercurrently to the intermediate pressure with gas from the equalization tank. Finally the bed is pressurized with feed air and the steps are repeated in a cyclic manner.

Other single-bed PSA processes are described in U.S. Pat. Nos. 4,065,272; 4,477,264; 5,228,888; 5,415,683; 5,658,371; 5,679,134; and 5,772,737; in Japan Patent Application Kokai Nos. H9-77502 and H10-1947080; and in European Patent Application EP 0 771 583 A1.

Several of the above-cited documents disclose multiple gas storage tanks to provide purge and repressurization gas. U.S. Pat. No. 5,370,728, U.S. Pat. No. 5,658,371, and European Patent Application EP 0 771 583 A1 describe the use of dual gas storage tanks in single-bed air separation systems for oxygen recovery. One tank stores void space gas or partial depressurization gas having lower oxygen purity and the other tank stores higher purity oxygen product gas. Stored gas having lower oxygen purity is used for partial repressurization of the adsorber while a portion of stored higher purity product gas is used for adsorber purging. U.S. Pat. No. 5,032,150 describes the recovery of nitrogen from air in a PSA system which uses multiple gas storage tanks, wherein one tank stores oxygen-rich gas for purging the adsorber and another tank stores nitrogen-rich product for displacing oxygen from the adsorber after purging is completed.

In many PSA processes, the use of a portion of the less strongly adsorbed product gas (for example, product oxygen) is used for purging the adsorber to displace more strongly adsorbed gas (for example, nitrogen) from the adsorber. In other PSA processes, a portion of the more strongly adsorbed product gas (for example, product nitrogen) is used for rinsing the adsorber to displace less strongly adsorbed gas (for example, oxygen). The efficient use of product gas for purging or rinsing is important in order to maximize product recovery and to minimize power consumption of the feed/evacuation blower in the PSA process. The invention described below and defined in the claims which follow offers an improved PSA process and system in which stored product gas is utilized at different pressure levels to provide purge gas or rinse at lower pressures and final product gas at a constant higher pressure.

BRIEF SUMMARY OF THE INVENTION

The general embodiment of the invention is a pressure swing adsorption process for the separation of a pressurized feed gas containing at least one more strongly adsorbable component and at least one less strongly adsorbable component to recover a final product gas enriched in one of the components, which process comprises:

(1) the steps of
  (1a) introducing the pressurized feed gas at a feed pressure into a feed inlet end of an adsorber vessel containing a solid adsorbent which preferentially adsorbs the more strongly adsorbable component, and withdrawing from an outlet end of the adsorber vessel an adsorber effluent gas enriched in the less strongly adsorbable component;
  (1b) depressurizing the adsorber vessel by withdrawing therefrom a gas stream enriched in the more strongly adsorbable component until the pressure therein reaches a minimum adsorber pressure;
  (1c) repressurizing the adsorber vessel from the minimum adsorber pressure to the feed pressure by introducing repressurization gas into the adsorber vessel; and
  (1d) repeating steps (1a) through (1c) in a cyclic manner;
(2) when the final product gas is a gas enriched in the less strongly adsorbable component, the additional steps of (2a) storing a portion of the adsorber effluent gas in a first gas storage tank and storing another portion of the adsorber effluent gas in a second gas storage tank;
  (2b) introducing gas from the first gas storage tank into outlet end of the adsorber vessel while simultaneously withdrawing gas from the feed inlet end of the adsorber vessel; and
  (2c) withdrawing the final product gas from the second gas storage tank during at least steps (1b) and (1c); and
(3) when the final product gas is a gas enriched in the more strongly adsorbable component, the additional steps of
  (3a) introducing a rinse gas enriched in the more strongly adsorbable component from a first gas storage tank into the feed inlet end of the adsorber vessel while simultaneously withdrawing gas from the outlet end of the adsorber vessel;
  (3b) during step (1b), storing a portion of the gas stream enriched in the more strongly adsorbable component in the first storage tank and storing another portion of the gas stream enriched in the more strongly adsorbable component in a second storage tank; and
  (3c) withdrawing the final product gas from the second gas storage tank during steps (1a), (1b), and (1c).

In a more specific embodiment, the invention is a pressure swing adsorption process for the separation of a pressurized feed gas containing at least one more strongly adsorbable component and at least one less strongly adsorbable component which comprises the steps of:

(a) introducing the pressurized feed gas at a feed pressure into a feed end of an adsorber vessel containing a solid adsorbent which preferentially adsorbs the more strongly adsorbable component, withdrawing from a product end of the adsorber vessel an adsorber effluent gas enriched in the less strongly adsorbable component, introducing a portion of the adsorber effluent gas into a first gas storage tank, introducing another portion of the adsorber effluent gas into a second gas storage tank, and withdrawing a final product gas from the second gas storage tank;

(b) terminating introduction of the pressurized feed gas into the adsorber vessel and depressurizing the adsorber vessel by withdrawing gas therefrom until the pressure therein reaches a minimum adsorber pressure, while continuing to withdraw a final product gas from the second gas storage tank;

(c) repressurizing the adsorber vessel from the minimum adsorber pressure to the feed pressure by introducing repressurization gas into the adsorber vessel, wherein at least a portion of the repressurization gas is provided from the first gas storage tank while the final product gas continues to be withdrawn from the second gas storage tank; and (d) repeating steps (a) through (c) in a cyclic manner.

The process may further comprise introducing stored adsorber effluent gas from the first gas storage tank into one end of the adsorber vessel during at least a portion of step (b) while depressurizing the adsorber vessel by withdrawing gas from the other end of the vessel.

Alternatively, the invention may include a step of introducing stored adsorber effluent gas from the first gas storage tank into one end of the adsorber vessel while withdrawing gas from the other end of the adsorber vessel such that the pressure in the adsorber vessel remains essentially constant at the minimum adsorber pressure.

If desired, stored adsorber effluent gas from the first gas storage tank can be introduced into one end of the adsorber vessel while withdrawing gas from the other end of the vessel such that the pressure in the adsorber vessel increases to a value intermediate the minimum adsorber pressure and the feed pressure.

The first gas storage tank and the second gas storage tank typically are in flow communication during step (b), and the first gas storage tank and the second gas storage tank typically are not in flow communication during step (c).

The pressure swing adsorption process of the invention may utilize a single adsorber vessel, or alternatively may utilize an adsorber vessel which is one of a plurality of adsorber vessels.

At least a portion of the depressurizing in step (b) may be effected by withdrawing void space gas enriched in the less strongly adsorbable component, and at least a portion of the withdrawn void space gas can be introduced into the second gas storage tank.

The feed gas for the process can be air, wherein the more strongly adsorbable component is nitrogen and the less strongly adsorbable component is oxygen. The process can utilize one or more solid adsorbents selected from the group consisting of monovalent or bivalent cation-exchanged zeolites having type A, type X, or mordenite structure.

Preferably, at least a portion of the depressurizing in step (b) is effected by evacuating the adsorber vessel to the minimum adsorber pressure. In this case, the minimum adsorber pressure will be below atmospheric pressure. If desired, at least a portion of the depressurizing in step (b) can be effected by venting pressurized gas from the adsorber vessel to the atmosphere.

The invention also includes a pressure swing adsorption system for the separation of a feed gas containing at least one more strongly adsorbable component and at least one less strongly adsorbable component which comprises:

(a) an adsorber vessel containing a solid adsorbent which preferentially adsorbs the more strongly adsorbable component, wherein the vessel has a feed end and a product end;

(b) blower, valve, and piping means for (1) introducing the feed gas into the feed end of the adsorber vessel and (2) withdrawing gas from the feed end of the adsorber vessel;

(c) piping means for withdrawing an adsorber effluent gas enriched in the less strongly adsorbable component from the product end of the adsorber vessel;

(d) a first gas storage tank for holding a portion of the adsorber effluent gas withdrawn from the product end of the adsorber vessel and a second gas storage tank for holding another portion of the adsorber effluent gas withdrawn from the product end of the adsorber vessel;

(e) piping and valve means for introducing adsorber effluent gas into the first and second gas storage tanks and for transferring adsorber effluent gas from the first gas storage tank into the adsorber vessel;

(f) valve means to isolate the first and second gas storage tanks from the adsorber vessel; and (g) piping and valve means for withdrawing stored adsorber effluent gas from the second gas storage tank as a final product gas enriched in the less strongly adsorbable component.

The pressure swing adsorption system may further comprise (h) control means associated with the valve means of (b), (e), and (f) to regulate gas flow during the steps of (1) introducing the pressurized feed gas at a feed pressure into a feed end of the adsorber vessel containing a solid adsorbent which preferentially adsorbs the more strongly adsorbable component, withdrawing from a product end of the adsorber vessel an adsorber effluent gas enriched in the less strongly adsorbable component, introducing a portion of the adsorber effluent gas into the first gas storage tank, and introducing another portion of the adsorber effluent gas into the second gas storage tank;

(2) terminating introduction of the pressurized feed gas into the adsorber vessel and depressurizing the adsorber vessel by withdrawing gas therefrom until the pressure therein reaches a minimum adsorber pressure, while continuing to withdraw a final product gas from the second gas storage tank;

(3) repressurizing the adsorber vessel from the minimum adsorber pressure to the feed pressure by introducing repressurization gas into the adsorber vessel, wherein at least a portion of the repressurization gas is provided from the first gas storage tank while the final product gas is withdrawn from the second gas storage tank; and (4) repeating steps (1) through (3) in a cyclic manner.

An alternative embodiment of the invention is a pressure swing adsorption system for the separation of a feed gas containing at least one more strongly adsorbable component and at least one less strongly adsorbable component which comprises:

(a) an adsorber vessel containing a solid adsorbent which preferentially adsorbs the more strongly adsorbable component, wherein the vessel has a feed end and a product end;

(b) piping means for withdrawing an adsorber effluent gas enriched in the less strongly adsorbable component from the product end of the adsorber vessel;

(c) a first gas storage tank for holding a portion of the gas enriched in the more strongly adsorbable component withdrawn from the feed end of the adsorber vessel; and a second gas storage tank for holding another portion of the gas enriched in the more strongly adsorbable component withdrawn from the feed end of the adsorber vessel;

(d) blower, valve, and piping means for (1) introducing the feed gas into the feed end of the adsorber vessel; (2) withdrawing gas enriched in the more strongly adsorbable component from the feed end of the adsorber vessel; and (3) transferring gas enriched in the more strongly adsorbable component from the feed end of the adsorber vessel into the first and second gas storage tanks;

(e) piping and valve means for transferring gas enriched in the more strongly adsorbable component from the first gas storage tank into the feed end of the adsorber vessel;

(f) valve means to isolate the first and second gas storage tanks from the adsorber vessel; and (g) piping and valve means for withdrawing stored gas from the second gas storage tank as a final product gas enriched in the more strongly adsorbable component.

DETAILED DESCRIPTION OF THE INVENTION

The present invention is an adsorptive process for the separation of a gas mixture containing at least one more strongly adsorbable component and at least one less strongly adsorbable component, wherein the process utilizes various combinations of feed, depressurization, evacuation, purge, rinse, and repressurization steps with dual product gas storage tanks to provide purge, rinse, and/or repressurization gas which is independent of the supply of the final gas product. The desired product gas can be enriched in either the more strongly adsorbable component or the less strongly adsorbable component, and the adsorption process cycle is selected to yield the desired product gas.

In the descriptions of the embodiments of the present invention given herein, the following meanings are associated with specific terms used.

A feed step occurs during the time in which pressurized feed gas is introduced into the adsorber vessel and the more strongly adsorbable component is selectively adsorbed by the adsorbent material contained therein.

Depressurization is defined as the withdrawal of gas from the adsorber vessel accompanied by decreasing adsorber pressure, which desorbs the more strongly adsorbable component. Depressurization can be achieved by venting gas from a superatmospheric pressure directly to the atmosphere or to another process vessel or enclosed volume which is at a lower pressure. Depressurization also can be achieved by evacuation, defined as the withdrawal of gas from the adsorber by mechanical means such as a vacuum pump or blower. Evacuation can be carried out over any range of adsorber pressures, but typically is carried out at subatmospheric pressures, i.e., under vacuum.

Repressurization is defined as the introduction of gas into the adsorber vessel accompanied by increasing adsorber pressure.

Purge is defined as the introduction of a purge gas, typically but not limited to product gas enriched in the less strongly adsorbable component, into one end of the adsorber while an effluent gas is withdrawn from the other end of the vessel. Usually the step is carried out countercurrently, i.e., in a flow direction opposite that of the feed step. Purge sweeps void space gas and desorbs any residual adsorbed components from the adsorbent. Purge can be carried out at any pressure, but is most effective at subatmospheric pressures. As will be described below, purge can be carried out during depressurization, evacuation, or repressurization, and thus the adsorber pressure may increase, decrease, or remain constant during any portion of a purge step.

Rinse is defined as the introduction of a rinse gas, typically product gas enriched in the more strongly adsorbable component, into one end of the adsorber while an effluent gas is withdrawn from the other end of the vessel. Typically the step is carried out cocurrently, i.e., in the same flow direction as the feed step. Rinse sweeps void space gas and desorbs any coadsorbed less strongly adsorbable component from the adsorbent. Gas withdrawn after a rinse step is enriched in the more strongly adsorbable component and provides a portion of the final product gas.

Void space gas is defined as nonadsorbed gas contained within the interstitial or interparticle volume within the adsorber vessel, and includes gas in the piping and dead volume in the vessel which is not occupied by adsorbent.

Final product gas is the gas withdrawn from a gas storage tank for external use and can be enriched in either the more strongly adsorbable or the less strongly adsorbable component.

The process steps of the first embodiment of the invention, in which the desired product is the less strongly adsorbable component, are described in detail below with reference to FIG. 1. The description is illustrated by the recovery of oxygen from air, but the process can be used to separate other gas mixtures as explained later.

1. Air Feed

Atmospheric air, preferably filtered by known methods to remove harmful particulate material, flows through feed line 1, inlet silencer 3, line 5, open valve 7, and line 9 into the inlet of blower 11. Blower 11, which typically is a rotary lobe Roots-type blower, compresses the air to a feed pressure typically in the range of 18 to 23 psia. An aftercooler (not shown) following the blower optionally can be used. Pressurized feed gas flows through open valve 15 and through lines 17 and 19 into adsorber vessel 21 containing adsorbent material which selectively adsorbs nitrogen, a more strongly adsorbed component in the air feed. Adsorber vessel 21 is initially at an intermediate pressure of about 14.5 to 15.5 psia as a result of a previous repressurization step (described below), and the pressures in adsorber vessel 21 and gas storage tank 31 are essentially equal. Pressurized feed air increases the pressure in the adsorber vessel to the full adsorption pressure of about 18 to 23 psia over a period of about 13 to 20 seconds. Water present in atmospheric air can be removed upstream of adsorber vessel 21 by known methods, or alternatively can be removed by the use of a layer of adsorbent at the adsorber inlet end which preferentially adsorbs water.

As the pressurized air feed passes through the adsorber vessel, it is enriched in oxygen, a less strongly adsorbed component in the air feed. Oxygen-enriched adsorber effluent typically containing 85 to 95 vol % oxygen is withdrawn through line 23, valve 25, and line 27. A portion of the adsorber effluent gas flows through line 29 into gas storage tank 31. The remainder passes through flow control valve 33 and line 35 to provide a final oxygen product gas.

The air feed step continues until the adsorbent approaches a predetermined level of nitrogen breakthrough and before complete adsorption equilibrium with feed air is reached in the adsorber. At this point the air feed step is terminated by closing valve 15 and opening valve 39. The typical duration of the air feed step is about 13 to 20 seconds.

Adsorber vessel 21 contains one or more adsorbents which preferentially adsorb nitrogen and thus enrich the adsorber effluent in oxygen. These adsorbents can be selected from the group consisting of monovalent or bivalent cation-exchanged zeolites having type A, type X, or mordenite structure. Specific examples are NaX, NaA, CaX, and CaA type zeolites.

2. Partial Depressurization/Provide Product

During this short step of about 0.5 to 2.0 seconds, adsorber vessel 21 is depressurized by about 0.2 to 1.0 psi, wherein oxygen-rich void space gas (and a small amount of desorbed nitrogen) flows through line 27 as additional oxygen product. This step, which is optional, recovers valuable oxygen product and eliminates noise which would occur if the gas were to be vented to the atmosphere. This step is terminated by closing valve 25 and opening valve 37.

3. Further Depressurization

Additional gas is withdrawn to further depressurize the adsorber and desorb the nitrogen adsorbed during the air feed step, thereby regenerating the adsorbent for the next air feed step. This gas is removed through line 19, valve 37, and line 9 by blower 11, which discharges the depressurization gas through line 13, valve 39, line 41, and silencer 43, from which it is vented to the atmosphere through line 45. Evacuation continues until a minimum adsorber pressure of about 4 to 8 psia is attained. Alternatively, adsorber vessel 21 can be partially depressurized directly to the atmosphere by opening valves 7, 15, and 37 (and preferably valve 39 as well). This would allow higher flow rates and quicker desorption. When the adsorber pressure approaches atmospheric pressure, valves 7 and 15 would be closed with valve 39 open, after which the further depressurization would be completed by evacuation using blower 11 as described above. The further depressurization step is typically 20 to 36 seconds in duration, and is terminated by partially opening valve 25.

4. Countercurrent Product Purge

A flow of product gas from gas storage tank 31 is drawn through partially open valve 25 to provide a countercurrent purge which sweeps the adsorbent and desorbs residual nitrogen. The purge gas admission rate is controlled approximately at the capacity of blower 11 such that the pressure in adsorber vessel 21 remains essentially constant at the minimum adsorber pressure between about 4 to 8 psia. The term essentially constant as used here means that the adsorber pressure varies by no more than about ±0.5 psi during this purge step. The duration of the purge step is between about 3 and 10 seconds, and the step is terminated by fully opening valve 25.

5. Countercurrent Product Purge and Partial Product Repressurization Product gas flows through fully open valve 25 and into adsorber vessel 21 at a rate faster than blower 11 can withdraw gas, thereby increasing the pressure in the vessel. This step lasts for about 2 to 5 seconds, during which the pressure in the adsorber vessel increases by about 1.5 to 3.0 psi to an intermediate pressure. During this period, purge of adsorber vessel 21 continues, which sweeps the adsorbent and desorbs residual nitrogen. By raising the adsorber pressure during the purge step, the power consumption of blower 11 is greatly reduced. In addition, raising the bed pressure during the repressurization step extends the duration of the step, and allows slower repressurization. This in turn helps to push the residual nitrogen front back towards the adsorber inlet and shortens overall cycle time. The step is terminated by closing valve 37 and opening valve 7, thereby idling blower 11.

6. Product Repressurization

Product gas from gas storage tank 31 flows through lines 27 and 29, valve 25, and line 23 into adsorber vessel 21, thereby increasing the pressure in the vessel to about 8 to 15 psia. The level of product repressurization determines the product purity obtained in the air feed step; higher repressurization will yield a higher product purity. This product repressurization step generally has a duration of 3 to 6 seconds, and is terminated by opening valve 15 and closing valve 39.

7. Dual-ended Repressurization

Repressurization of adsorber vessel 21 continues with product gas flowing countercurrently into the vessel from gas storage tank 31, while simultaneously pressurized feed air flows into the vessel from feed blower 11 through line 13, valve 15, line 17, and line 19. This continues until the pressure in adsorber vessel 21 and gas storage tank 31 are equalized at a typical pressure between about 15 to 19 psia. Alternatively, partial repressurization with air can be effected at subatmospheric adsorber pressure by connecting adsorber vessel 21 to the atmosphere with valves 15, 37, and 39 open (and preferably valve 7 open as well) such that air is drawn into the adsorber until the pressure therein approaches atmospheric. Further repressurization by blower 11 then would continue at superatmospheric pressure by closing valves 37 and 39 until the pressures in adsorber vessel 21 and gas storage tank 31 equalize at about 19 to 24 psia. Further repressurization by blower 11 then would continue at superatmospheric pressure until the pressure in adsorber vessel 21 and gas storage tank 31 equalize at a typical pressure between about 19 to 24 psia. The duration of the dual-ended repressurization step is about 2 to 6 seconds.

As pressurized air feed continues to flow into the adsorber, oxygen-rich adsorber effluent begins to flow out of the adsorber. At this point, the dual-ended repressurization step is complete, the air feed step 1 begins, and the cycle is repeated.

During steps 1 through 7 described above, final oxygen product gas is withdrawn continuously through valve 33 and line 35. During steps 1 and 2, the total gas flow from adsorber vessel 21 through lines 23 and 27 provides gas to storage tank 31 via line 29 and oxygen product via line 35. During steps 3 through 7, final oxygen gas product is withdrawn from gas storage tank 31 via lines 29 and 35. During steps 4 through 7, gas is also withdrawn from gas storage tank 31 via lines 29 and 27 for adsorber vessel purge and repressurization. Gas storage tank 31 is designed to be of sufficient volume to provide purge and repressurization gas while providing final oxygen product at the required pressure and flow rate.

The PSA cycle described above is operated by valves 7, 15, 25, 37, and 39 which are opened and closed at the required times by control signals from control system 51 using hardware and software systems known in the art. Any microprocessor-based controller which has digital as well as analog signal capability can be used, and software can be readily developed using standard commercially-available packages.

A summary of the PSA cycle described above is given in Table 1, which indicates the valve position and time duration for each cycle step for the cycle described above. A plot of the absolute pressures in adsorber vessel 21 and gas storage tank 31 as a function of time is shown in FIG. 2.

TABLE 1

Figure 2:
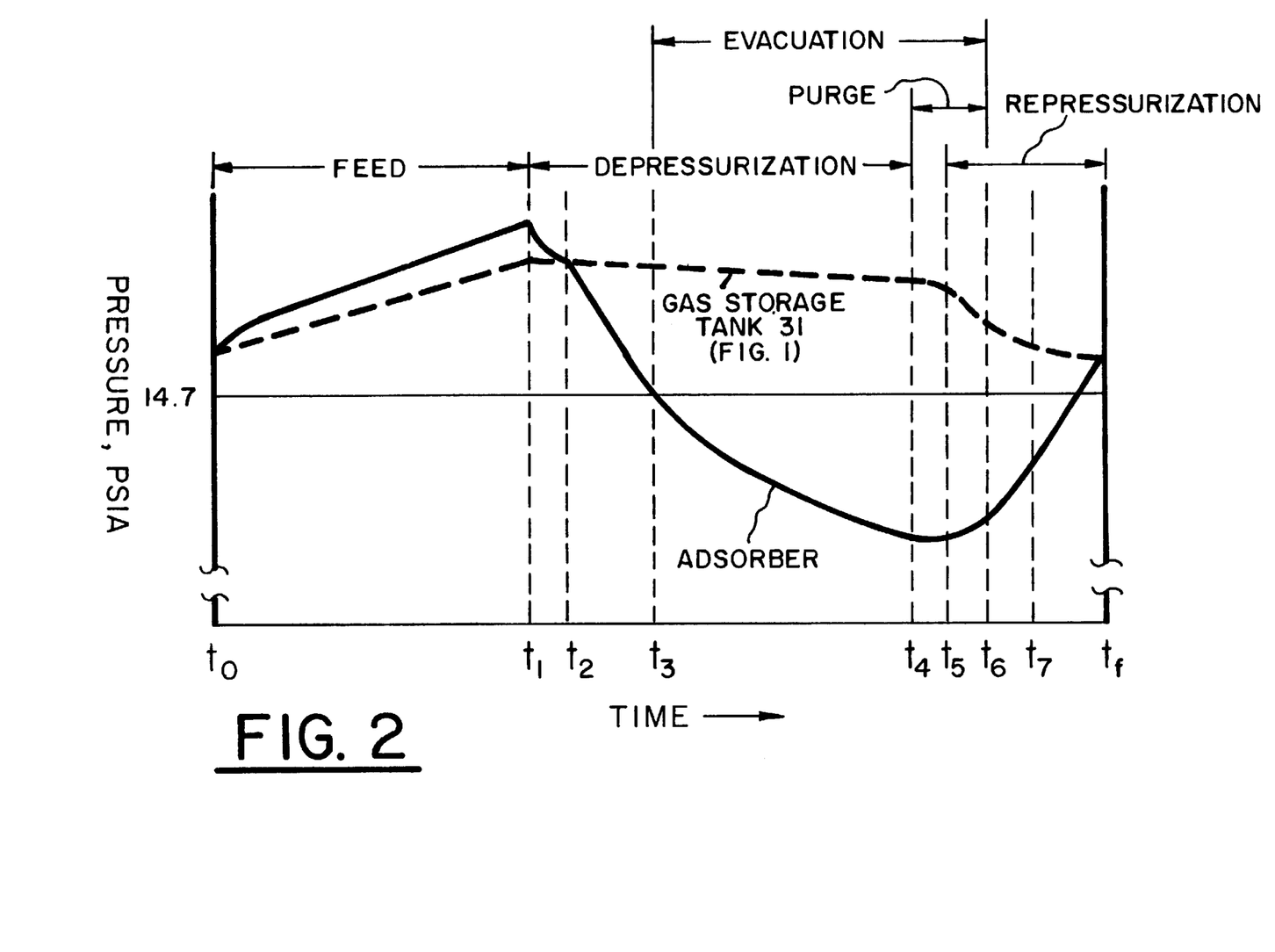
FIG. 2 is a plot of adsorber and gas storage tank pressures vs. time for a process cycle of the present invention.

Cycle and Valve Position Summary
(Time Periods from FIG. 2)

| Cycle Step | Time Period | Sec. | Valve Number 7 | 15 | 25 | 37 | 39 |
|---|---|---|---|---|---|---|---|
| 1) Air Feed | $t_0$–$t_1$ | 13–20 | O | O | O | C | C |
| 2) Provide Product | $t_1$–$t_2$ | 0.5–2.0 | O | C | O | C | O |
| 3) Further Depressurization | $t_2$–$t_4$ | 20–36 | C | C | C | O | O |
| 4) Product Purge | $t_4$–$t_5$ | 3–10 | C | C | PO | O | O |

TABLE 1-continued

Cycle and Valve Position Summary
(Time Periods from FIG. 2)

| Cycle Step | Time Period | Sec. | Valve Number 7 | 15 | 25 | 37 | 39 |
|---|---|---|---|---|---|---|---|
| 5) Prod. Purge/ Repressurizat'n | $t_5-t_6$ | 2–5 | C | C | O | O | O |
| 6) Product Repressurization | $t_6-t_7$ | 3–6 | O | C | O | C | O |
| 7) Dual-ended Repressurization | $t_7-t_f$ | 2–6 | O | O | O | C | C |

Valve Position: O = Open PO = Partially Open C = Closed

The total cycle time from $t_0-t_f$ is typically in the range of about 45 to 85 seconds.

During further depressurization step (3), the adsorber pressure drops from the adsorber feed pressure to about atmospheric pressure during period $t_2-t_3$ and then is evacuated to the minimum adsorber pressure during period $t_3-t_4$.

Figure 3:
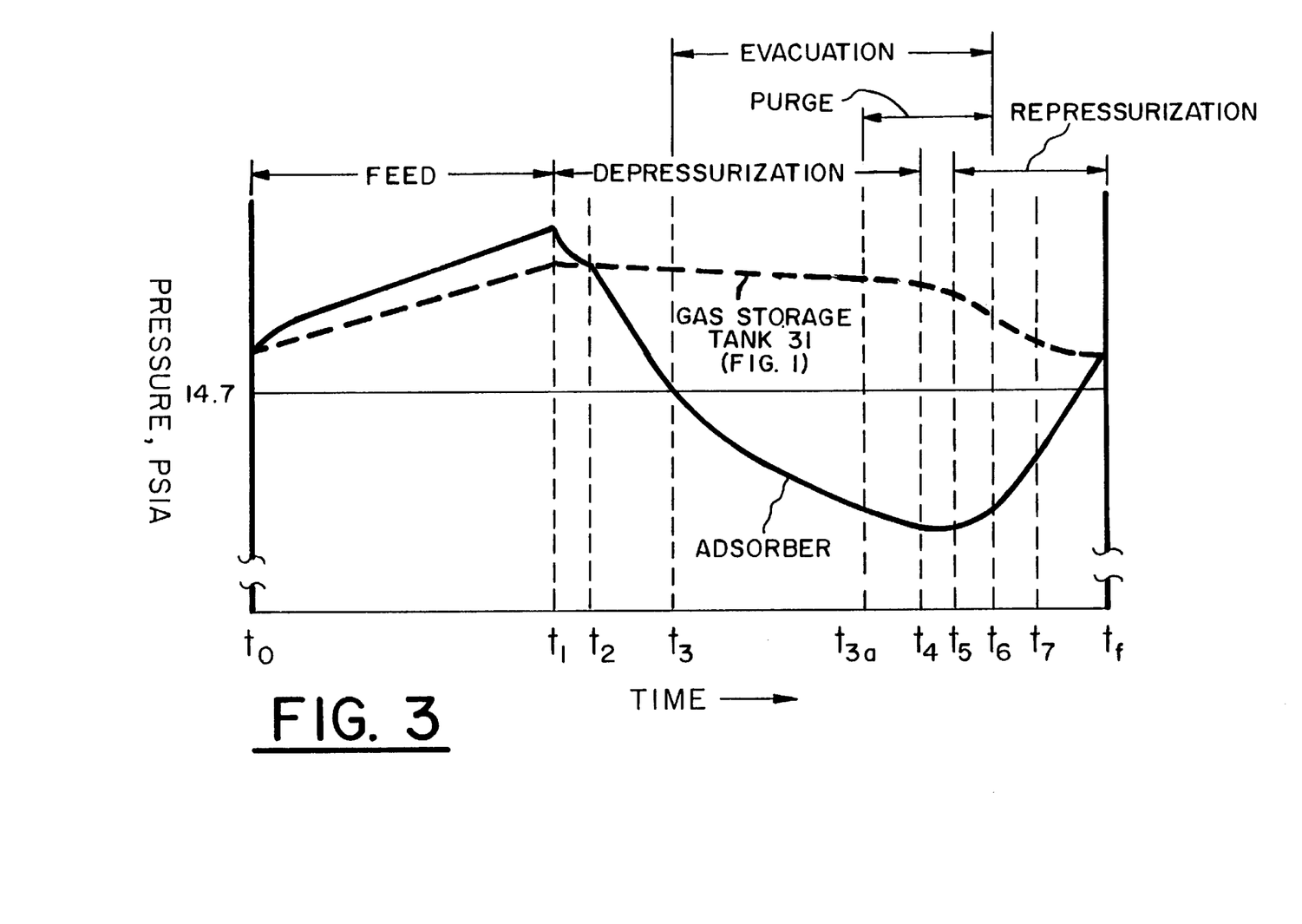
FIG. 3 is a plot of adsorber and gas storage tank pressures vs. time for an alternative process cycle of the present invention.

In an alternative embodiment of the invention, a flow of product gas from gas storage tank 31 is withdrawn through partially open valve 25 during at least a portion of further depressurization step (3) to provide a countercurrent purge gas which sweeps the adsorbent and desorbs residual nitrogen. The purge gas flow rate is controlled by valve 25 such that the pressure in adsorber vessel 21 continues to decrease by net gas withdrawal from the vessel. A summary of this alternative cycle is given in Table 2, which indicates the valve position and time duration for each cycle step for the cycle. A plot of the absolute pressures in adsorber vessel 21 and gas storage tank 31 as a function of time is shown in FIG. 3. The duration of this depressurization/purge step (3a) can be between 2 and 6 seconds. While the depressurization/purge step is shown Table 2 and FIG. 3 as occurring immediately before the adsorber reaches its minimum pressure, the step can occur during any portion of the further depressurization step between $t_2$ and $t_4$.

TABLE 2

Cycle and Valve Position Summary
(Time Periods from FIG. 3)

| Cycle Step | Time Period | Sec. | Valve Number 7 | 15 | 25 | 37 | 39 |
|---|---|---|---|---|---|---|---|
| 1) Air Feed | $t_0-t_1$ | 13–20 | O | O | O | C | C |
| 2) Provide Product | $t_1-t_2$ | 0.5–2.0 | O | C | O | C | O |
| 3) Further Depressurization | $t_2-t_{3a}$ | 20–36 | C | C | C | O | O |
| 3a) Depressurization and Purge | $t_{3a}-t_4$ | 2–5 | C | C | PO | O | O |
| 4) Product Purge | $t_4-t_5$ | 2–5 | C | C | PO | O | O |
| 5) Prod. Purge/ Repressurizat'n | $t_5-t_6$ | 2–5 | C | C | O | O | O |
| 6) Product Repressurization | $t_6-t_7$ | 3–6 | O | C | O | C | O |
| 7) Dual-ended Repressurization | $t_7-t_f$ | 2–6 | O | O | O | C | C |

Valve Position: O = Open PO = Partially Open C = Closed

The total cycle time from $t_0-t_f$ is typically in the range of about 40 to 85 seconds.

Thus a beneficial feature of the present invention is the introduction of purge gas from product gas storage tank 31 while the adsorber is being depressurized in steps (3) or (3a), while the adsorber is being evacuated at the minimum adsorber pressure in step (4), or during the countercurrent product purge and partial product repressurization in step (5). Various alternative purge options are possible in which purge gas is introduced into adsorber vessel 21 from gas storage tank 31 during any one of, or any combination of, steps (3), (3a), (4), and (5). Preferably purge gas is introduced at least during steps (4) and (5) as described in the first embodiment of the invention described earlier. Alternatively, purge gas can be introduced only during steps (3a), (4), and (5).

EXAMPLE

Figure 1:
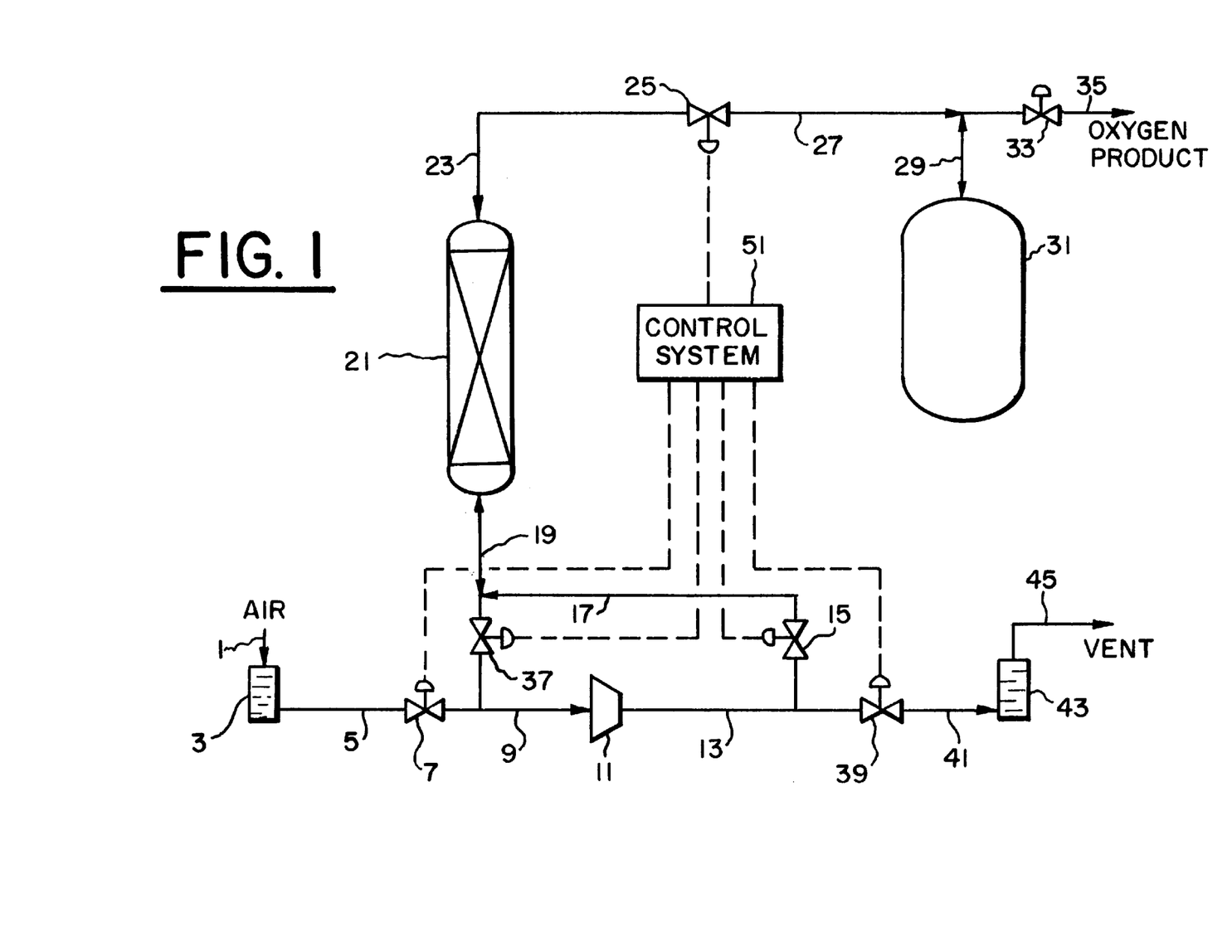
FIG. 1 is a schematic flow diagram of an embodiment of the present invention.

The single-bed PSA system of FIG. 1 was operated according to the cycle of Table 2 and FIG. 3. A single adsorber vessel was used which contained 600 lbs of activated alumina (loaded at the inlet end for water removal) and 3500 lbs of an X-type zeolite adsorbent in which about 85.6% of the exchangeable ion content was lithium, about 8.0% of the exchangeable ion content was zinc, and the remainder of the exchangeable ion content was sodium and potassium. The PSA system was operated to produce 5 tons/day of 90 vol % oxygen product and utilized a product storage tank volume of 700 cubic feet. The adsorber and gas storage tank pressure profiles were determined as shown in FIG. 3. The operation during steps (3a), (4), and (5) was monitored closely and operating data were obtained for adsorber pressure and evacuation gas flow rates and compositions. Blower power was calculated from measured gas pressures and flowrates. Measured and calculated data are given in Table 3 below.

TABLE 3

Operating Data for Steps (3a), (4), and (5)

| Cycle Description | | | | Evacuated Gas | | Specific Power[-1] |
|---|---|---|---|---|---|---|
| Step | Elapsed Time, Seconds | Bed Press., Psia | Blower Power, HP | Flow, ACFM | Flow, SCFM | Mole % $N_2$ | ACFM HP |
| 3a | 42 | 7.5 | 69.0 | 1704 | 825 | 90.0 | 24.7 |
| 3a | 43 | 7.2 | 72.0 | 1685 | 782 | 91.0 | 23.4 |
| 3a | 44 | 7.0 | 73.5 | 1672 | 753 | 91.5 | 22.8 |
| 4 | 45 | 6.9 | 74.4 | 1665 | 739 | 92.0 | 22.4 |
| 4 | 46 | 6.8 | 75.3 | 1658 | 725 | 93.0 | 22.0 |
| 4 | 47 | 7.0 | 73.5 | 1672 | 753 | 94.0 | 22.8 |
| 5 | 48 | 7.2 | 72.0 | 1685 | 782 | 94.0 | 23.4 |
| 5 | 49 | 8.1 | 63.9 | 1754 | 949 | 94.5 | 27.4 |
| 5 | 50 | 9.5 | 50.5 | 1817 | 1128 | 94.0 | 36.0 |

Figure 4:
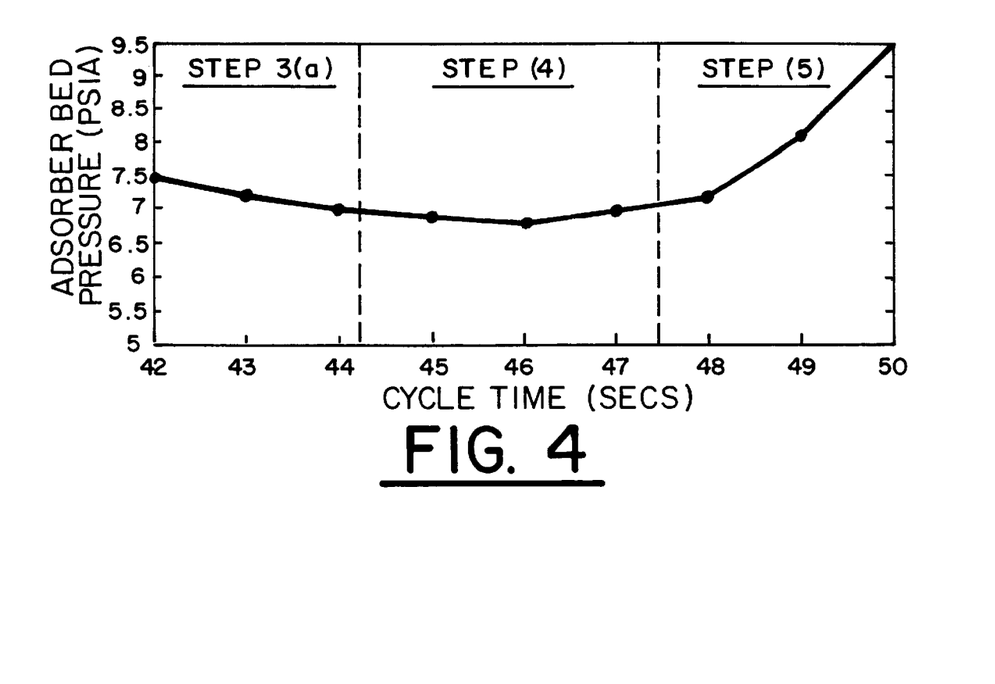
FIG. 4 is a plot of adsorber vessel pressure vs. time during the purge steps of the process cycle of FIG. 3.
Figure 5:
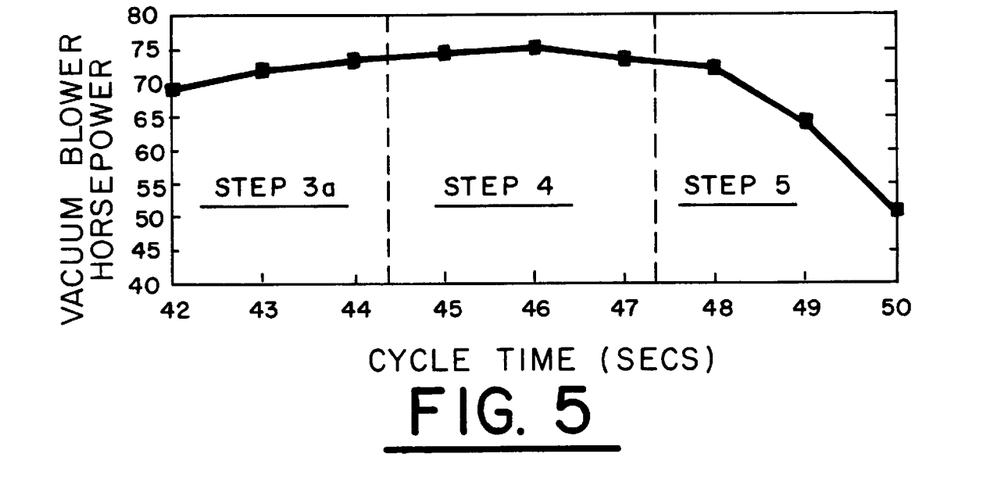
FIG. 5 is a plot of vacuum blower horsepower vs. time during the purge steps of the process cycle of FIG. 3.

The adsorber pressure profile and blower vacuum power as functions of elapsed time shown for purge steps 3a, 4, and 5 in FIGS. 4 and 5 respectively. These data illustrate the benefit of simultaneous purge/repressurization (step 5) wherein the specific power of the vacuum blower decreases significantly during this step. In addition, partial repressurization during purge shortens the duration of the overall regeneration period (steps 3 through 7 of Table 2) compared with a cycle in which purge and repressurization steps are carried out sequentially.

Figure 6:
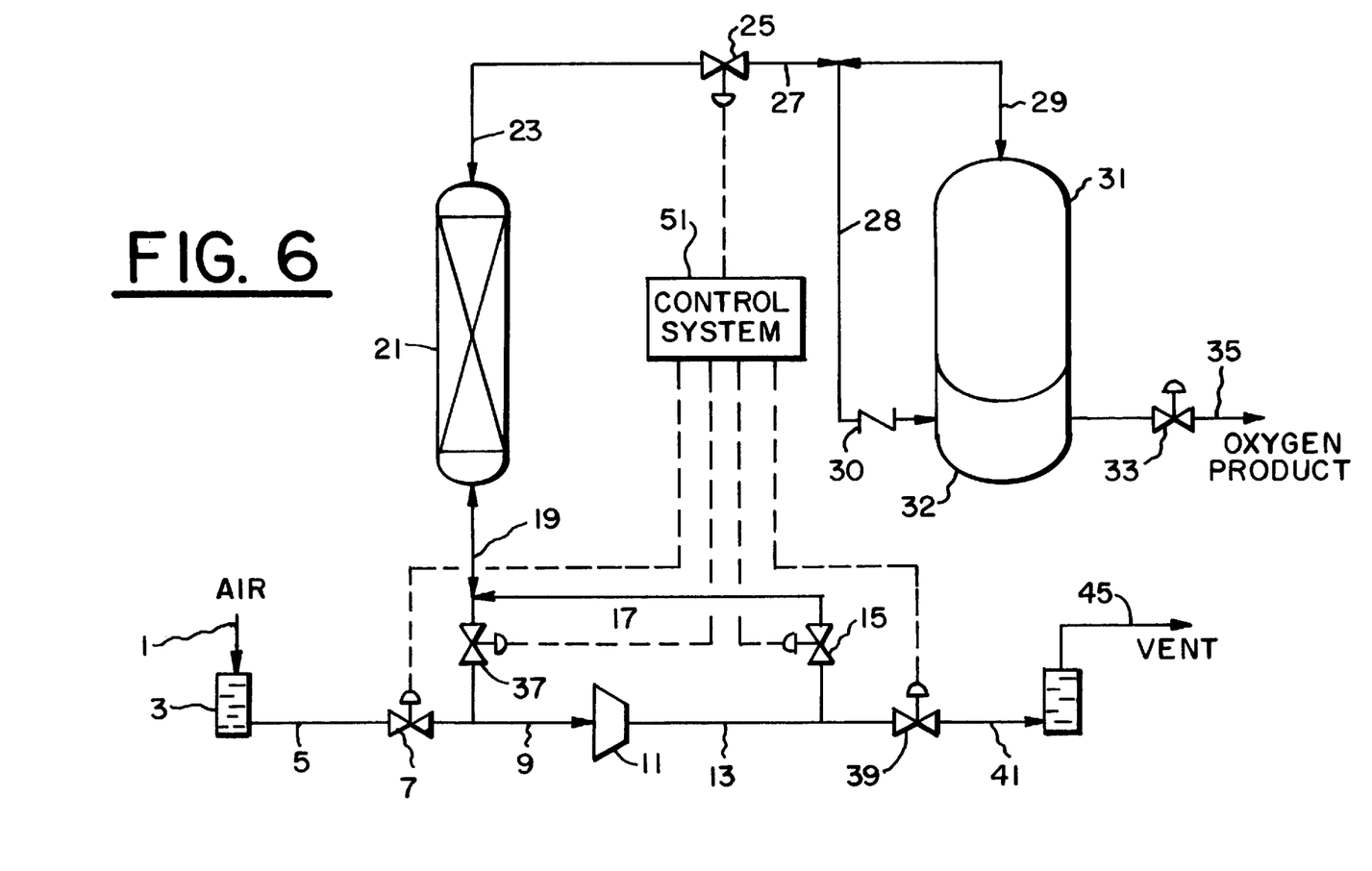
FIG. 6 is a schematic flow diagram of an alternative embodiment of the present invention.

An alternative embodiment of the invention is shown in the schematic flow diagram of FIG. 6. In this preferred embodiment, additional product gas storage tank 32 is utilized to complement gas storage tank 31. Gas storage tank 32, which is connected to adsorber effluent line 27 via line 28 and check valve 30, can be integrated with gas storage tank 31 as shown or can be a separate tank. Check valve 30 allows flow into gas storage tank 32 only when the gas pressure in line 28 (and thus the gas pressure in line 29 and gas storage tank 31 as well) is slightly greater than the pressure in gas storage tank 32 by the small differential pressure (typically 0.25 to 0.5 psi) required to open check valve 30. This ensures that the gas pressure in gas storage tank 31 is always less than or approximately equal to the pressure in gas storage tank 32, prevents backflow of gas from tank 32 into line 28, and ensures that gas flows out of tank 32 only via flow control valve 33 and line 35.

The volume of tank 31 is typically two or more times the volume of tank 32. The actual volume of tank 31 is sized to provide the required volume of purge and repressurization gas, while the actual volume of tank 32 is sized to provide sufficient final product flow and pressure during the adsorber depressurization, purge, and repressurization steps.

During cycle steps (1) and (2) described above in Tables 1 and 2, during which the pressure in adsorber vessel 21 is greater than the pressures in gas storage tanks 31 and 32, adsorber effluent product gas flows via line 29 into gas storage tank 31 and via line 28 and check valve 30 into gas storage tank 32. Final product gas is continuously withdrawn through flow control valve 33 and line 35. The minimum pressure in gas storage tank 32 is selected at a few psi above the required pressure of final product gas in line 35.

During step 3 of either cycle in Tables 1 and 2, during which valve 25 is closed, the pressures in tanks 31 and 32 will be approximately equal and will decrease at about the same rate as product gas is withdrawn via line 35. When purge is initiated in step (4) of Table 1 or step (3a) of Table 2 by opening valve 25, the gas pressure will decrease more rapidly as gas flows out of tank 31, and check valve 30 will close thereby isolating tank 32 from tank 31. The pressure in tank 32 will fall at a rate dictated by the required product flow rate via control valve 33 and line 35, while the pressure in tank 31 will fall more rapidly at a rate dictated by the required purge rate through valve 25 and into adsorber vessel 21. This feature of the invention allows the use of lower pressure gas from tank 31 for purge while utilizing higher pressure gas from tank 31 for final product, which is a more efficient use of available gas pressure than the earlier-described use of the single gas storage tank of FIG. 1. This feature in turn translates into a reduced power requirement for operating blower 11 in the vacuum or evacuation mode.

In this embodiment, adsorber vessel 21 is pressurized during step (7) of either cycle in Table 1 or Table 2 by introducing feed gas via line 19 and product gas from tank 31 via line 23. After the pressures in adsorber 21 and tank 31 equalize, effluent gas product from adsorber 21 will flow via line 29 into tank 31. When the pressure in tank 31 reaches the pressure in tank 32 (plus the small differential pressure needed to open check valve 30), product gas from line 27 will flow into both tanks 31 and 32 until the cycle of either Table 1 or Table 2 is completed at time $t_f$. The next cycle then proceeds as above.

Figure 7:
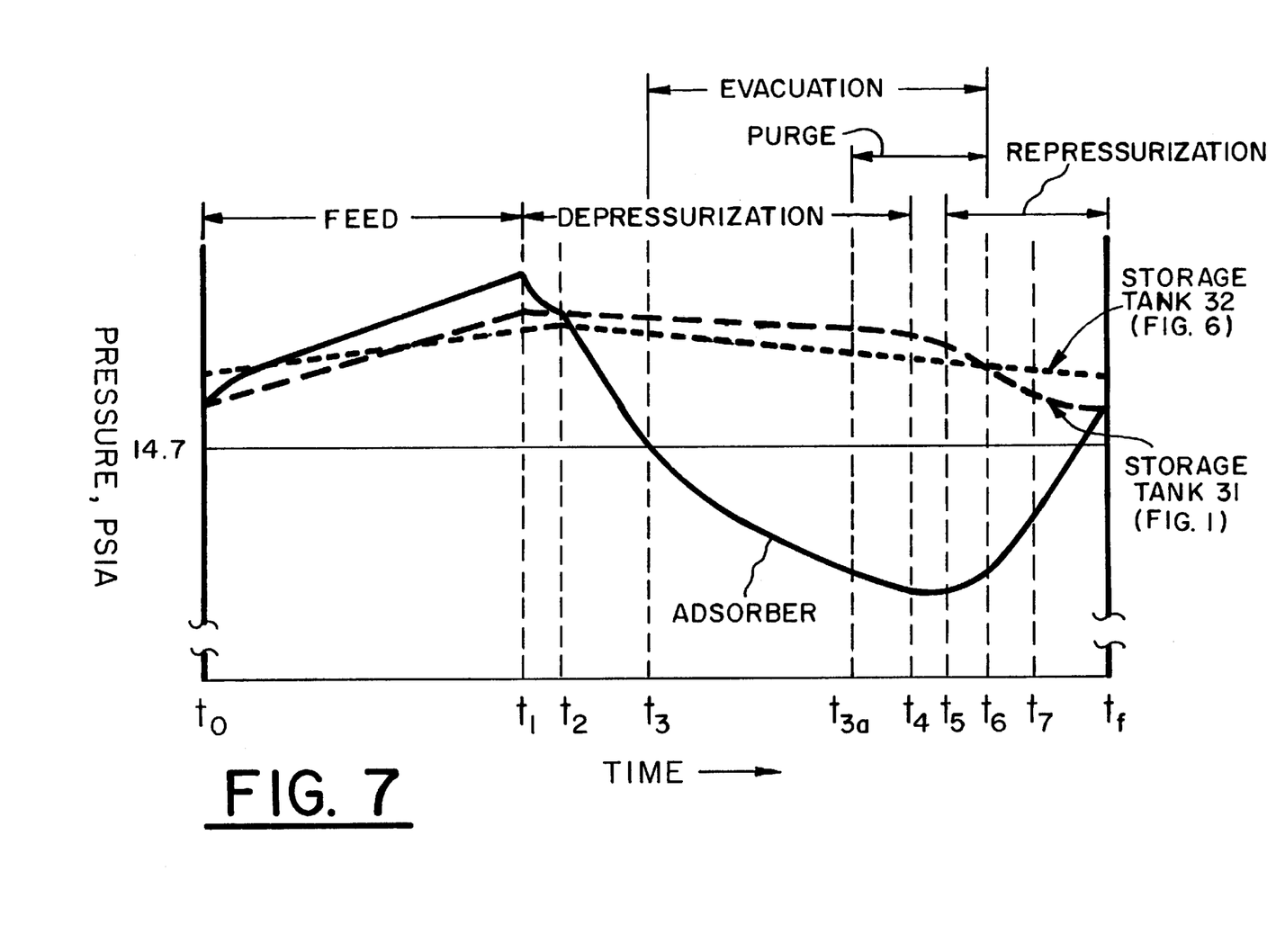
FIG. 7 is a plot of adsorber and product gas storage tank pressures vs. time for the process cycle of FIG. 3 utilizing a single gas storage tank (FIG. 1) compared with the same cycle using dual gas storage tanks (FIG. 6).

A comparison of the pressure profiles of single product gas storage tank 31 (FIG. 1) and product gas storage tank 32 in the dual tank alternative of FIG. 6 is given in FIG. 7. It is seen that the pressure in product gas storage tank 32 (FIG. 6) fluctuates less than the pressure in product gas storage tank 31 (FIG. 1), since no gas is withdrawn from tank 32 for purging. This allows the more efficient use of available gas pressure in tank 31 of FIG. 6 for purging compared with the earlier-described use of the single gas storage tank 31 of FIG. 1, since gas can be withdrawn from tank 31 of FIG. 6 at lower pressures than tank 31 of FIG. 1. This feature in turn translates into a reduced power requirement for operating blower 11 in the vacuum or evacuation mode.

The embodiment of FIG. 6 using dual product gas storage tanks is not restricted to the single adsorber process cycles described above, and can be used with any number of adsorber vessels and any adsorption process cycle which yields a product gas enriched in the less strongly adsorbed component wherein a portion of this product gas is used for a purge step. The dual product storage tanks are utilized as above during periods in which no product gas is available directly from an adsorber vessel.

In an alternative embodiment of the invention, the concept of dual product storage tanks can be used in PSA processes in which the desired product gas is enriched in the more strongly adsorbed component which is recovered by desorption in a depressurization and evacuation step. Such a process can be used, for example, to recover nitrogen as the more strongly adsorbed component from air while discharging a byproduct stream of nitrogen-depleted air. An adsorber vessel in this type of PSA process (which can utilize a single or multiple adsorber vessels) operates utilizing at least the following basic cycle steps:

(1) adsorption, in which feed gas is introduced into the adsorber vessel, the more strongly adsorbed component is retained on the adsorbent, and an effluent gas enriched in the less strongly adsorbed component is withdrawn from the adsorber vessel;

(2) rinse, in which previously stored product gas enriched in the more strongly adsorbed component is passed through the adsorber vessel cocurrently to displace void space gas and desorb any coadsorbed, less strongly adsorbed components;

(3) depressurization/evacuation, in which the more strongly adsorbed component is desorbed and withdrawn as a product gas, a portion of which is stored in a first storage tank for future rinse steps and another portion of which is stored in a second storage tank for withdrawal as a final product gas; and (4) repressurization; in which pressurized feed gas is introduced into the evacuated adsorber vessel until it reaches the adsorption pressure, after which step (1) is repeated.

In this alternative embodiment, gas withdrawal from the first gas storage tank for rinse can be carried out independently of gas withdrawal from the second gas storage tank to provide the final product gas. This allows the use of stored gas from the first storage tank for rinse at lower pressures while enabling better control of final product gas pressure during withdrawal from the second gas storage tank.

Thus the broadest description of the present invention, which can be applied to any PSA process, is the use of dual product gas storage tanks to enable (1) a constant delivery of product gas at a required pressure during periods when no product gas is available for withdrawal from an adsorber vessel, and (2) the independent use of stored product gas for repressurization, purging, and/or rinsing of adsorber vessels.

The PSA process cycles of the present invention are described above for the preferred application of air separation for oxygen production. These process cycles also can be used for the separation of other gas mixtures by using appropriate adsorbent(s) and cycle times. The process can be applied, for example, in the recovery of moderate purity hydrogen from petroleum refinery offgases, in the drying of air, and in the removal of heavier hydrocarbons from natural gas. Adsorbents useful for these separations include activated carbon, types A and X zeolites, and mordenite.

The use of dual product storage tanks yields several benefits. Stored product gas can be utilized more efficiently because purge, rinse, and/or repressurization gas can be provided at lower pressures than if a single product tank were used. In addition, final product gas pressure can be controlled more effectively because the pressure of gas stored for this purpose fluctuates over a smaller range during each process cycle, and thus storage vessel volume and cost can be reduced.

Thus the PSA process of the present invention offers an efficient method for gas separation to yield a product containing about 80–95 vol % of the main product component at recoveries of about 40–75%. The preferred use of dual product tanks allows stored product gas to be utilized more efficiently because purge, rinse, and/or repressurization gas can be provided at lower pressures than if a single product tank were used. In addition, final product gas pressure can be controlled more effectively because the pressure of gas stored for this purpose fluctuates over a smaller range than if a single product storage tank were used. Further, the use of two separate gas storage tanks can reduce total vessel volume and cost compared with the use of a single product gas storage vessel.

The essential characteristics of the present invention are described completely in the foregoing disclosure. One skilled in the art can understand the invention and make various modifications without departing from the basic spirit of the invention, and without deviating from the scope and equivalents of the claims which follow.

What is claimed is:

1. A pressure swing adsorption process for the separation of a pressurized feed gas containing at least one more strongly adsorbable component and at least one less strongly adsorbable component to recover a final product gas enriched in one of the components, which process comprises:

(a) introducing the pressurized feed gas at a feed pressure into a feed inlet end of an adsorber vessel containing a solid adsorbent which preferentially adsorbs the more strongly adsorbable component, and withdrawing from an outlet end of the adsorber vessel an adsorber effluent gas enriched in the less strongly adsorbable component;

(b) depressurizing the adsorber vessel by withdrawing therefrom a gas stream enriched in the more strongly adsorbable component until the pressure therein reaches a minimum adsorber pressure;

(c) repressurizing the adsorber vessel from the minimum adsorber pressure to the feed pressure by introducing repressurization gas into the adsorber vessel; and (d) repeating steps (a) through (c) in a cyclic manner;
   wherein the final product gas is a gas enriched in the more strongly adsorbable component, and wherein the process comprises the additional steps of (1) introducing a rinse gas enriched in the more strongly adsorbable component from a first gas storage tank into the feed inlet end of the adsorber vessel while simultaneously withdrawing gas from the outlet end of the adsorber vessel;

(2) during step (b), storing a portion of the gas stream enriched in the more strongly adsorbable component in the first storage tank and storing another portion of the gas stream enriched in the more strongly adsorbable component in a second storage tank; and (3) withdrawing the final product gas from the second gas storage tank during steps (a), (b), and (c).

2. A pressure swing adsorption process for the separation of a pressurized feed gas containing at least one more strongly adsorbable component and at least one less strongly adsorbable component which comprises the steps of:

(a) introducing the pressurized feed gas at a feed pressure into a feed end of an adsorber vessel containing a solid adsorbent which preferentially adsorbs the more strongly adsorbable component, withdrawing from a product end of the adsorber vessel an adsorber effluent gas enriched in the less strongly adsorbable component, introducing a portion of the adsorber effluent gas into a first gas storage tank, introducing another portion of the adsorber effluent gas into a second gas storage tank, and withdrawing a final product gas from the second gas storage tank;

(b) terminating introduction of the pressurized feed gas into the adsorber vessel and depressurizing the adsorber vessel by withdrawing gas therefrom until the pressure therein reaches a minimum adsorber pressure, while continuing to withdraw a final product gas from the second gas storage tank;

(c) repressurizing the adsorber vessel from the minimum adsorber pressure to the feed pressure by introducing repressurization gas into the adsorber vessel, wherein at least a portion of the repressurization gas is provided from the first gas storage tank while the final product gas continues to be withdrawn from the second gas storage tank; and (d) repeating steps (a) through (c) in a cyclic manner; wherein during step (c) stored adsorber effluent gas from the first gas storage tank is introduced into one end of the adsorber vessel while gas is withdrawn from the other end of the vessel such that the pressure in the adsorber vessel increases to a value intermediate the minimum adsorber pressure and the feed pressure.

3. The pressure swing adsorption process of claim 2 which further comprises introducing stored adsorber effluent gas from the first gas storage tank into one end of the adsorber vessel during at least a portion of step (b) while depressurizing the adsorber vessel by withdrawing gas from the other end of the vessel.

4. The pressure swing adsorption process of claim 2 which further comprises introducing stored adsorber effluent gas from the first gas storage tank into one end of the adsorber vessel while withdrawing gas from the other end of the adsorber vessel such that the pressure in the adsorber vessel remains essentially constant at the minimum adsorber pressure.

5. The pressure swing adsorption process of claim 2 wherein the first gas storage tank and the second gas storage tank are in flow communication during step (b).

6. The pressure swing adsorption process of claim 2 wherein the first gas storage tank and the second gas storage tank are not in flow communication during step (c).

7. The pressure swing adsorption process of claim 2 wherein the adsorber vessel is a single adsorber vessel.

8. The pressure swing adsorption process of claim 2 wherein the adsorber vessel is one of a plurality of adsorber vessels.

9. The pressure swing adsorption process of claim 2 wherein the feed gas is air, the more strongly adsorbable component is nitrogen, and the less strongly adsorbable component is oxygen.

10. The pressure swing adsorption process of claim 2 wherein the solid adsorbent is selected from the group consisting of monovalent or bivalent cation-exchanged zeolites having type A, type X, or mordenite structure.

11. The pressure swing adsorption process of claim 2 wherein at least a portion of the depressurizing in step (b) is effected by venting pressurized gas from the adsorber vessel to the atmosphere.

12. The pressure swing adsorption process of claim 2 wherein at least a portion of the depressurizing in step (b) is effected by evacuating the adsorber vessel to the minimum adsorber pressure.

13. The pressure swing adsorption process of claim 2 wherein the minimum adsorber pressure is below atmospheric pressure.

14. A pressure swing adsorption process for the separation of a pressurized feed gas containing at least one more strongly adsorbable component and at least one less strongly adsorbable component which comprises the steps of:

(a) introducing the pressurized feed gas at a feed pressure into a feed end of an adsorber vessel containing a solid adsorbent which preferentially adsorbs the more strongly adsorbable component, withdrawing from a product end of the adsorber vessel an adsorber effluent gas enriched in the less strongly adsorbable component, introducing a portion of the adsorber effluent gas into a first gas storage tank, introducing another portion of the adsorber effluent gas into a second gas storage tank, and withdrawing a final product gas from the second gas storage tank;

(b) terminating introduction of the pressurized feed gas into the adsorber vessel and depressurizing the adsorber vessel by withdrawing gas therefrom until the pressure therein reaches a minimum adsorber pressure, while continuing to withdraw a final product gas from the second gas storage tank;

(c) repressurizing the adsorber vessel from the minimum adsorber pressure to the feed pressure by introducing repressurization gas into the adsorber vessel, wherein at least a portion of the repressurization gas is provided from the first gas storage tank while the final product gas continues to be withdrawn from the second gas storage tank; and (d) repeating steps (a) through (c) in a cyclic manner; wherein at least a portion of the depressurizing in step (b) is effected by withdrawing void space gas enriched in the less strongly adsorbable component, and wherein at least a portion of the withdrawn void space gas is introduced into the second gas storage tank.

15. A pressure swing adsorption system for the separation of a feed gas containing at least one more strongly adsorbable component and at least one less strongly adsorbable component which comprises:

(a) an adsorber vessel containing a solid adsorbent which preferentially adsorbs the more strongly adsorbable component, wherein the vessel has a feed end and a product end;

(b) blower, valve, and piping means for (1) introducing the feed gas into the feed end of the adsorber vessel and (2) withdrawing gas from the feed end of the adsorber vessel;

(c) piping means for withdrawing an adsorber effluent gas enriched in the less strongly adsorbable component from the product end of the adsorber vessel;

(d) a first gas storage tank for holding a portion of the adsorber effluent gas withdrawn from the product end of the adsorber vessel and a second gas storage tank for holding another portion of the adsorber effluent gas withdrawn from the product end of the adsorber vessel;

(e) piping and valve means for introducing adsorber effluent gas into the first and second gas storage tanks and for transferring adsorber effluent gas from the first gas storage tank into the adsorber vessel;

(f) valve means to isolate the first and second gas storage tanks from the adsorber vessel;

(g) piping and valve means for withdrawing stored adsorber effluent gas from the second gas storage tank as a final product gas enriched in the less strongly adsorbable component; and (h) control means associated with the valve means of (b), (e), and (f) to regulate gas flow during the steps of (1) introducing the pressurized feed gas at a feed pressure into a feed end of the adsorber vessel containing a solid adsorbent which preferentially adsorbs the more strongly adsorbable component, withdrawing from a product end of the adsorber vessel an adsorber effluent gas enriched in the less strongly adsorbable component, introducing a portion of the adsorber effluent gas into the first gas storage tank, and introducing another portion of the adsorber effluent gas into the second gas storage tank;

(2) terminating introduction of the pressurized feed gas into the adsorber vessel and depressurizing the adsorber vessel by withdrawing gas therefrom until the pressure therein reaches a minimum adsorber pressure, and withdrawing a final product gas from the second gas storage tank;

(3) repressurizing the adsorber vessel from the minimum adsorber pressure to the feed pressure by introducing repressurization gas into the product end of the adsorber vessel, wherein at least a portion of the repressurization gas is provided from the first gas storage tank while the final product gas is withdrawn from the second gas storage tank, and wherein gas is withdrawn from the feed end of the adsorber vessel while the pressure in the adsorber vessel increases from the minimum adsorber pressure to a value intermediate the minimum adsorber pressure and the feed pressure; and (4) repeating steps (1) through (3) in a cyclic manner.

16. A pressure swing adsorption system for the separation of a feed gas containing at least one more strongly adsorbable component and at least one less strongly adsorbable component which comprises:

(a) an adsorber vessel containing a solid adsorbent which preferentially adsorbs the more strongly adsorbable component, wherein the vessel has a feed end and a product end;

(b) piping means for withdrawing an adsorber effluent gas enriched in the less strongly adsorbable component from the product end of the adsorber vessel;

(c) a first gas storage tank for holding a portion of the gas enriched in the more strongly adsorbable component withdrawn from the feed end of the adsorber vessel and a second gas storage tank for holding another portion of the gas enriched in the more strongly adsorbable component withdrawn from the feed end of the adsorber vessel;

(d) blower, valve, and piping means for (1) introducing the feed gas into the feed end of the adsorber vessel (2) withdrawing gas enriched in the more strongly adsorbable component from the feed end of the adsorber vessel; and (3) transferring gas enriched in the more strongly adsorbable component from the feed end of the adsorber vessel into the first and second gas storage tanks;

(e) piping and valve means for transferring gas enriched in the more strongly adsorbable component from the first gas storage tank into the feed end of the adsorber vessel;

(f) valve means to isolate the first and second gas storage tanks from the adsorber vessel; and (g) piping and valve means for withdrawing stored gas from the second gas storage tank as a final product gas enriched in the more strongly adsorbable component.

* * * * *